US012617501B2

(12) United States Patent
    Courteau

(10) Patent No.: US 12,617,501 B2
(45) Date of Patent: May 5, 2026

(54) MARINE DATA INSTRUMENT MOUNTING APPARATUS

(71) Applicant: Kyle Courteau, Winnipeg (CA)

(72) Inventor: Kyle Courteau, Winnipeg (CA)

( * ) Notice: Subject to any disclaimer, the term of this patent is extended or adjusted under 35 U.S.C. 154(b) by 324 days.

(21) Appl. No.: 18/598,551

(22) Filed: Mar. 7, 2024

(65) Prior Publication Data

US 2025/0282456 A1 Sep. 11, 2025

(51) Int. Cl.
    *B63B 49/00* (2006.01)
    *A01K 97/12* (2006.01)
    *A01K 97/22* (2006.01)

(52) U.S. Cl.
    CPC ............ *B63B 49/00* (2013.01); *A01K 97/125* (2013.01); *A01K 97/22* (2013.01)

(58) Field of Classification Search
    CPC ........ B63B 49/00; A01K 97/125; A01K 97/22
    See application file for complete search history.

(56) References Cited

U.S. PATENT DOCUMENTS

| | | | | |
|---|---|---|---|---|
| 4,907,208 A | * | 3/1990 | Lowrance | G01S 7/521 |
| | | | | 367/173 |
| 2006/0175766 A1 | * | 8/2006 | Carnevali | B63B 49/00 |
| | | | | 277/628 |
| 2016/0259049 A1 | * | 9/2016 | Proctor | G01S 15/876 |

* cited by examiner

*Primary Examiner* — Richard M Camby
(74) *Attorney, Agent, or Firm* — Ryan W. Dupuis; Kyle R. Satterthwaite; Ade & Company Inc.

(57) ABSTRACT

A marine data instrument mounting apparatus supports various components of a marine data instrument, for example a fishfinder or a chartplotter, on a portable frame for use in different environments. The apparatus has a frame that adjustably supports a display screen of the marine data instrument thereon so that height and/or angle of the screen is adjustable and that also supports a battery for powering the instrument. When the instrument is capable of sonar imaging, a sonar module for communicating sonar signals from a transducer head can also be supported on the frame together with the display unit and battery. A separate transducer mounting assembly suspends the transducer head from a pole in several different modes in cooperation with an indicator at an opposing end of the pole to indicate the selected mode of the transducer head.

18 Claims, 8 Drawing Sheets

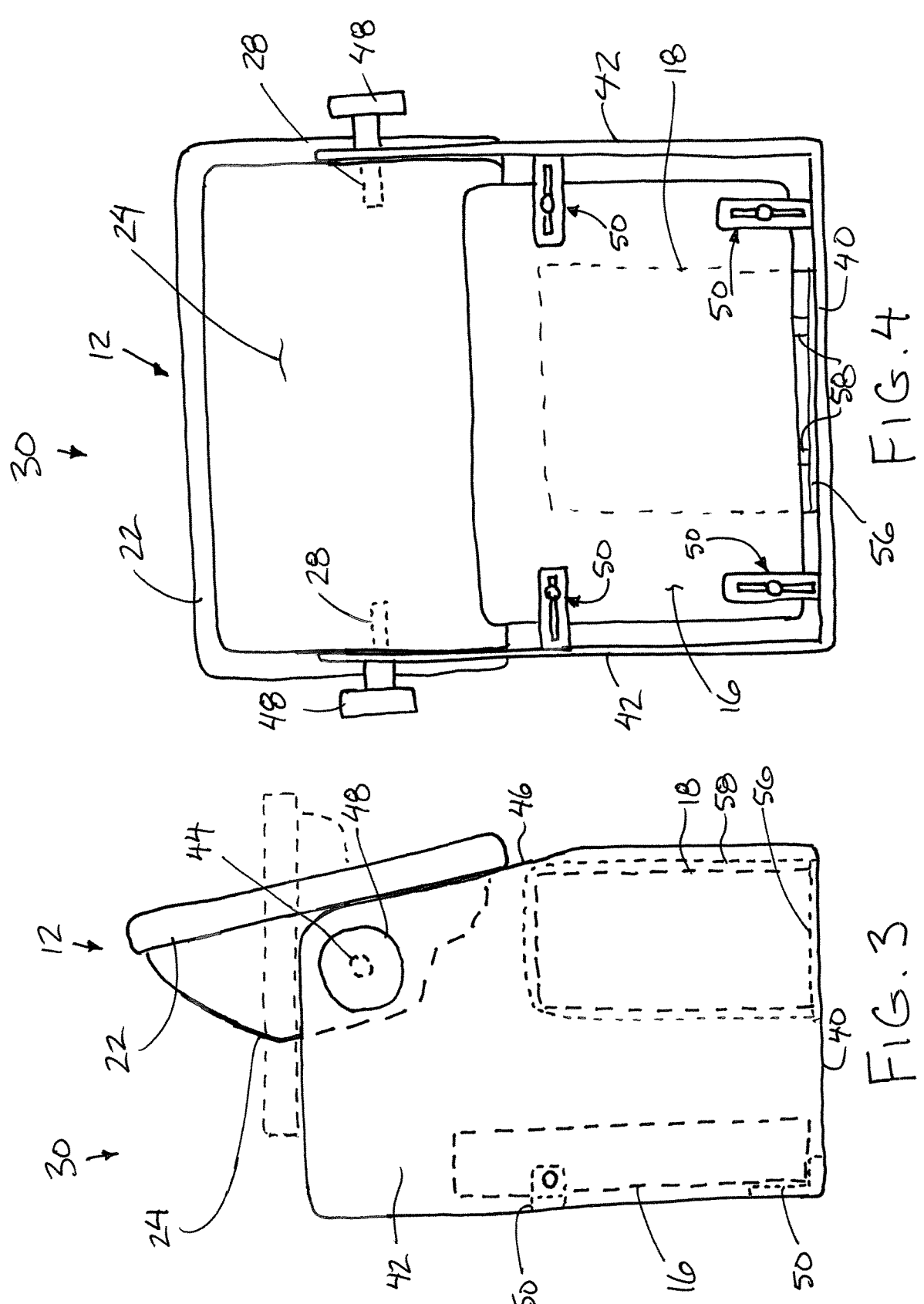

MARINE DATA INSTRUMENT MOUNTING APPARATUS

FIELD OF THE INVENTION

The present invention relates to a mounting apparatus for supporting components of a marine data instrument thereon such as a chartplotter or fishfinder, and more particularly the present invention relates to a mounting apparatus for supporting a display unit of the marine data instrument and/or supporting a transducer head of the marine data instrument.

BACKGROUND

In the sport of fishing, it is common to use a marine data instrument such as a fishfinder for sonar imaging of underwater objects or a chartplotter for tracking position relative to maps. In many instances chartplotters can also be optionally configured for sonar imaging too. When equipped for sonar imaging, the marine data instrument uses a transducer head to emit and receive sonar signals that are then used by the computer controller of a display unit of the sonar instrument to generate a sonar image representing various submerged objects such as the contours of the floor of a body of water or the presence of fish within the body of water. Marine instruments equipped for sonar imaging may comprise forward facing sonar or live imaging sonar for example.

A typical marine data instrument as described above has a display unit that is arranged to be mounted on a suitable supporting surface of a marine vessel to be readily visible by an operator of the vessel. The display unit would be connected to a power supply of the vessel such as a battery. When equipped for sonar imaging, a separate sonar module is also commonly used to process and/or amplify signals between the display unit and the transducer. The transducer is typically intended to be mounted in a submerged manner by either supporting the transducer on an exterior surface of the vessel that is submerged during use of the vessel, or on a pole-type structure that can be suspended in a partly submerged manner from the vessel.

In order to make use of known marine data instruments in a portable manner, for example when ice fishing or when using the instruments on different vessels, it is desirable for the display unit, the sonar module, and the battery to be transported together on a common carrier, while the transducer is mounted on a separate pole structure that can be attached to various vessels or suspended from various structures such as being suspended through an ice fishing hole to submerge the transducer.

One known type of carrier for a marine data instrument comprises a rectangular housing intended to enclose the battery and the sonar module therein, with the horizonal upper boundary wall of the housing providing a mounting surface to support the display unit thereon in a conventional manner, for example using a conventional bail mounting bracket. The resulting arrangement is large and cumbersome for a user to transport.

Known pole structures for supporting the transducer head of the marine data instrument suspended through an ice fishing hole typically comprise a mounting frame that can span over an ice fishing hole when supported upon the surrounding sheet of ice and a pole suspended from the mounting frame that supports the transducer head thereon. The pole may accommodate mounting the transducer head in more than one orientation. In addition, the poles are commonly rotatably supported on the mounting frame such that the direction of the transducer head can be adjusted by rotating the pole. Once the transducer head has been submerged within the body of water through an ice fishing hole, it is difficult to determine both the orientation of the transducer head relative to the pole, and the angular position transducer head about an axis of the pole as the pole is rotated. The sonar image is very difficult to interpret by the user if the orientation and angular position are not apparent to the user of the marine data instrument.

SUMMARY OF THE INVENTION

According to one aspect of the invention there is provided a marine data instrument mounting apparatus for supporting a display unit of a marine data instrument relative to a battery, in which the display unit includes a housing, a display screen extending laterally across a front face of the housing, and a pair of threaded mounting sockets at laterally opposing sides of the housing, the apparatus comprising:

a base frame including a base member forming a bottom of the apparatus and two side walls extending upwardly from the base member at laterally spaced apart locations; and a mounting arrangement arranged to support the battery securely on the frame above the base member and between the side walls;

wherein the two side walls of the base frame are spaced apart to receive a portion of housing of the marine data instrument extending laterally between the two side walls;

wherein the two side walls include two mounting apertures formed in the two side walls in alignment with one another along a common axis so as to be arranged for alignment with the threaded mounting sockets of the housing; and wherein the two mounting apertures are spaced above the mounting arrangement so as to be arranged to support the display unit on the base frame at least partly above the battery.

The arrangement of the base frame provides a structure that supports the display unit, the sonar module, and a battery of a marine data instrument thereon in a compact and efficient manner to improve portability and ease of use of the marine data instrument. Furthermore, the apparatus described herein, replaces the need for using the factory supplied bail mount which is limited to supporting the display unit thereon.

When the display unit includes a perimeter mounting flange at the front face protruding outwardly from a remaining portion of the housing in a direction of the display screen, the mounting apertures may be spaced rearwardly from a front edge of the side walls of the frame by a prescribed distance such that the mounting apertures are aligned with the mounting sockets of the display unit when the perimeter mounting flange abuts the front edges of the side walls of the base frame in the instance of larger screens. For smaller screens, the mounting flange may fit between the two side walls. Preferably the front edges of the side walls are sloped upwardly and rearwardly.

The apparatus may further include a plurality of mounting brackets supported on the side walls so as to be arranged to support a sonar module of the marine data instrument on the base frame securely on the base frame above the base member and between the side walls. In this instance, the mounting brackets may be located adjacent a rear of the base frame and below the mounting apertures in the frame.

According to a second aspect of the present invention there is provided a marine data instrument mounting apparatus for supporting a display unit of a marine data instrument, in which the display unit includes a housing, a display screen extending laterally across a front face of the housing, and a perimeter mounting flange at the front face protruding outwardly from a remaining portion of the housing in a direction of the display screen, the apparatus comprising:

a base frame including a base member forming a bottom of the apparatus and two side walls extending upwardly from the base member at laterally spaced apart locations; and a pivot frame including a front wall having a display opening formed therein and two side flanges at opposing ends of the front wall, wherein the side flanges are pivotally coupled to the two side walls of the base frame respectively such that the pivot frame is pivotal relative to the base frame about a pivot axis between a stored position and a working position, wherein the front wall is in an upright orientation in the working position, and wherein the pivot frame protrudes a greater distance from the base member in the working position than in the stored position;

wherein the front wall is arranged to support the perimeter mounting flange of the display unit in overlapping configuration with the front wall about a periphery of the display opening while the display opening in the front wall is sized to receive said remaining portion of the housing of the display unit inserted therein.

The arrangement of the base frame together with a pivot frame in this instance, again provides a structure that supports the display unit, the sonar module, and a battery of a marine data instrument thereon in a compact and efficient manner to improve portability and ease of use of the marine data instrument. The pivot frame in particular allows a larger display unit to be displaced between a compact storage position for ease of transport, and an upright extended position for improved visibility, while remaining readily portable on a common structure with the sonar module and battery of the marine data instrument.

Preferably the pivot axis is adjacent to a bottom of the front wall in the working position of the pivot frame, and adjacent to a front of the base frame.

The front wall of the pivot frame may be substantially parallel to the base member of the base frame in the stored position.

Preferably when stops are provided on the frames to prevent pivotal displacement of the pivot frame beyond the working position, the stops support the front wall of the pivot frame to extend upward at a rearward slope in the working position.

The apparatus preferably also includes a mounting arrangement arranged to support a battery of the marine data instrument securely on the base frame above the base member and between the side walls such that the battery does not interfere with pivotal movement of the display unit with the pivot frame between the stored position and the working position.

The apparatus may further include (i) a tray supported rearwardly of the front wall so as to be arranged to receive one or more fishing lures supported thereon, and (ii) a light source supported adjacent to the tray so as to be arranged to illuminate said one or more fishing lures supported on the tray. The light source is preferably a blacklight or UV-A light that emits long-wave ultraviolet light and comparatively little visible light for charging glowing type fishing lures with light. The light source may be directed forwardly towards a rear of the front wall in the working position so as to provide backlighting to a portion of the front wall above the display opening in the working position.

According to a further aspect of the present invention there is provided a marine data instrument mounting apparatus for supporting a display unit of a marine data instrument, in which the display unit includes a housing, a display screen extending laterally across a front face of the housing, and a perimeter mounting flange at the front face protruding outwardly from a remaining portion of the housing in a direction of the display screen, the apparatus comprising:

a base frame;

a front wall supported on the base frame in an upright orientation in a working position of the front wall, the front wall having a display opening formed therein and sized to receive said remaining portion of the housing of the display unit inserted therein whereby the front wall is arranged to support the perimeter mounting flange of the display unit in overlapping configuration with the front wall about a periphery of the display opening;

a tray supported rearwardly of the front wall so as to be arranged to receive one or more fishing lures supported thereon; and an ultraviolet light source supported adjacent to the tray so as to be arranged to illuminate said one or more fishing lures supported on the tray with ultraviolet light.

This arrangement allows fluorescent fishing lures to be supported in close proximity to a light source for charging the fluorescent material of the lure with light prior to submerging the lure within a body of water while fishing for maximizing the fluorescence of the lure while fishing.

According to another aspect of the present invention there is provided a marine data instrument mounting apparatus for supporting a transducer head of a marine data instrument relative to a supporting surface, in which the transducer head includes mounting bore, the apparatus comprising:

a pole extending longitudinally between a top end and a bottom end of the pole;

a mounting frame arranged to support the pole relative to the supporting surface, the mounting frame being rotatable relative to the pole about a longitudinal axis of the pole; and a transducer mounting assembly supported on the bottom end of the pole, the transducer mounting assembly comprising:

(i) a mounting body having a longitudinal axis;

(ii) a first pivot coupling supporting the mounting body on the bottom end of the pole such that the mounting body is pivotal about a first pivot axis between a first mode in which the longitudinal axis of the mounting body is substantially parallel to the pole and a second mode in which the longitudinal axis of the mounting body is oriented transversely to the pole; and (iii) a second pivot coupling arranged for operative connection to the mounting bore of the transducer head so as to support the transducer head for pivotal movement relative to the mounting body about a second pivot axis oriented perpendicularly to the first pivot axis.

The arrangement of the transducer mounting assembly allows the operator to quickly change the orientation of the transducer head between any one of a forward mode of operation, a down mode of operation or a perspective mode of operation of the marine data instrument by quickly releasing and locking one or both of the pivot couplings.

The apparatus may further include an indicator supported on the pole in proximity to the top end of the pole, in which the indicator is pivotal about a longitudinal axis of the pole and is arranged to indicate a direction radially of the pole corresponding to an orientation of the transducer head relative to the pole. More particularly, the indicator is preferably pivotal between a first mark on the pole corresponding to the first mode and a second mark on the pole corresponding to the second mode, wherein the indicator is pivotal through a range of 90 degrees between the first mark and the second mark. In this instance, one of the marks preferably corresponds to a radial direction of the indicator that is perpendicular to the first pivot axis.

According to a further aspect of the present invention there is provided a marine data instrument mounting apparatus for supporting a transducer head of a marine data instrument relative to an ice fishing hole formed in a surrounding sheet of ice, in which the transducer head includes a mounting bore, the apparatus comprising:

a pole extending longitudinally between a top end and a bottom end of the pole;

a mounting frame protruding radially outward from the pole at an intermediate location along a length of the pole in a working position, the mounting frame being sized to define an overall frame diameter which is greater than a diameter of the ice fishing hole so as to be arranged to support the pole suspended coaxially within the ice fishing hole when engaged upon the surrounding sheet of ice, the mounting frame being rotatable relative to the pole about a longitudinal axis of the pole;

a transducer mounting assembly supported on the bottom end of the pole and being arranged for operative connection with the mounting bore of the transducer head so as to support the transducer head for pivotal movement relative to the pole between a first position corresponding to a first mode and a second position corresponding to a second mode; and an indicator supported on the pole in proximity to the top end of the pole, the indicator being pivotal about a longitudinal axis of the pole and being arranged to indicate a direction radially of the pole corresponding to an orientation of the transducer head relative to the pole.

The arrangement of the indicator which is pivotal between two indicating positions that correspond to the different positions of the transducer mounting assembly, provides visual feedback to an operator to assist in determining the angular orientation and radial direction of the transducer head, which in turn assists the operator in interpreting the sonar data displayed on the display unit.

BRIEF DESCRIPTION OF THE DRAWINGS

Some embodiments of the invention will now be described in conjunction with the accompanying drawings in which:

FIG. 3 is a side elevational view of the first assembly of the marine data instrument mounting apparatus according to the first embodiment of FIG. 1 with the display unit shown in an upright position in solid line and the display unit in a lowered position in broken line;

FIG. 4 is a rear elevational view of the first assembly of the marine data instrument mounting apparatus according to the first embodiment of FIG. 1;

In the drawings like characters of reference indicate corresponding parts in the different figures.

DETAILED DESCRIPTION

Figures 1, 2:
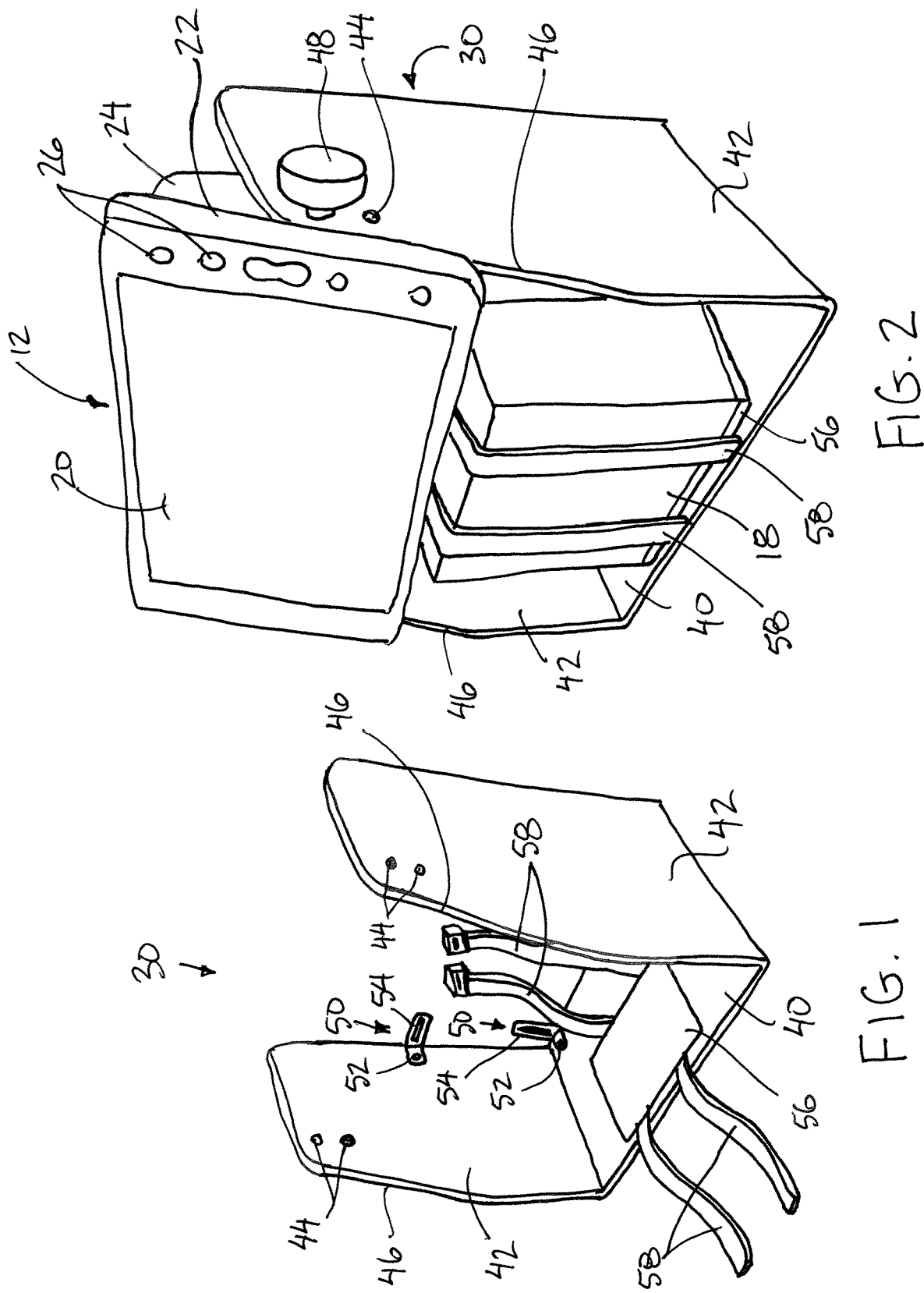
FIG. 1 is a perspective view of a first assembly of the marine data instrument mounting apparatus according to a first embodiment.
FIG. 2 is another perspective view of the first assembly of the marine data instrument mounting apparatus according to the first embodiment of FIG. 1 shown with various components of a marine data instrument supported thereon.

Referring to the accompanying figures there is illustrated a marine data instrument mounting apparatus for supporting various components of a marine data instrument thereon, for example a chartplotter or a fishfinder. The marine data instrument typically comprises a display unit 12 including an internal computer controller, a transducer head 14 operating under control of the controller of the display unit for emitting and receiving sonar signals, a sonar module 16 for processing and amplifying signals between the controller of the display unit and the transducer head, and a battery 18 for supplying electrical power.

The display unit 12 includes a main housing supporting a display screen 20 thereon that spans laterally across the width of the housing and spans across most of the front side of the housing for displaying sonar data to a user. A perimeter mounting flange 22 is located at the front side of the housing supporting the display screen thereon in which the mounting flange 22 protrudes laterally outward at both sides and along the top and bottom ends of the housing within a plane lying parallel to the display screen 20 so as to protrude outwardly about the full perimeter of the housing relative to a remaining rear portion 24 of the housing. The perimeter mounting flange 22 is used when installing the display unit relative to a supporting surface in a flush mount installation. In some models, various operating buttons 26 may be located on the front face beside the screen to receive operator inputs. Electrical connectors are provided on the rear portion of the display unit for connecting suitable cables for communication with the battery 18, the transducer head 14 and the sonar module 16.

In order to enable the display unit 12 to be supported in a bail mount configuration, the housing further includes two mounting sockets 28 at laterally opposing ends of the display unit within the rear portion in which the mounting sockets 28 are internally threaded for cooperation with suitable mounting screws while being aligned with one another along a common axis about which the display unit can typically be pivotally adjusted in a mounted configuration.

In order to enable the display unit to be supported in a flush mount configuration, the perimeter mounting flange 22 is provided with mounting sockets communicating through the rear of the perimeter mounting flange so that the sockets are perpendicular to a plane of the display screen 20. The mounting sockets for flush mount may be through-holes or internally threaded sockets which allow mounting of the perimeter mounting flange 22 to a suitable supporting surface overlapped by the flange by inserting suitable mounting screws through the flush mount mounting sockets.

The marine data instrument mounting apparatus according to the present invention generally includes (i) a first assembly 30 for supporting the display unit 12, the sonar module 16, and the battery 18 thereon according to various embodiments shown in the accompanying figures, and (ii) a second assembly 32 for supporting the transducer head 14 thereon to enable the transducer head to be supported on a suitable supporting structure or surface, for example a marine vessel, or suspended through an ice fishing hole 34 formed in a sheet of ice 36 such that the transducer head is submerged within a body of water immediately below the sheet of ice 86.

Turning now to FIGS. 1 through 4, a first embodiment of the first assembly 30 of the marine data instrument mounting apparatus will now be described in further detail. The first assembly 30 in this instance includes (i) a base frame comprising a unitary body of material having a base member 40 defining a bottom side of the base frame arranged to be engaged upon a horizontal supporting surface and (ii) two side walls 42 joined integrally the base member 40 to extend upwardly therefrom. More particularly, the base member 40 is a flat rectangular plate spanning a lateral width between opposing ends which may be approximately equal to the lateral width of the rear portion 24 of the display unit for some models, or may be less than the width between the side walls in other models. The flat bottom side of the base member 40 defines the bottom of the assembly that is engaged upon a supporting surface.

The two side walls 42 are oriented perpendicularly to the base member 40 while being parallel to one another to extend vertically upward from laterally opposing ends of the base member. The side walls 42 are spaced apart from one another by a lateral width that is approximately equal to the lateral width of the rear portion of the display unit between the mounting sockets 28 at opposing ends of the display unit. The side walls 42 remain somewhat flexible relative to the base member 40 such that upper free ends of the side walls 42 which serve to support the display unit 12 thereon can be varied slightly in lateral distance relative to one another to accommodate minor variations to the lateral width of the rear portion of the display unit 12.

The side walls 42 include one or more sets of mounting apertures 44 formed therein. For each set of mounting apertures 44, each side wall 42 includes a respective one of the two mounting aperture 44 of the set formed therein for alignment with and cooperation with respective ones of the mounting sockets 28 of the display unit. The apertures 44 of each set are aligned along a common axis that is horizontal, parallel to the base member, and perpendicular to the side walls. The sets of apertures are located at different heights from the base member so that a height of the display unit relative to the base member can be adjusted by selecting which mounting apertures 44 are used to cooperate with the mounting sockets 28 of the display unit.

The mounting apertures 44 are positioned nearer to the front edges 46 of the side walls than the opposing rear edges. Each of the front edges includes a lower portion which extends perpendicularly upward from the base frame and an upper portion corresponding approximately to a height of the display unit which is sloped upwardly and slightly rearwardly. The mounting apertures 44 are positioned at an intermediate position along the height of the sloped upper portions of the front edges 46.

The mounting apertures 44 are spaced rearward from the front edges 46 by a normal distance which is approximately equal to the normal distance between the mounting sockets 28 and the rear surface of the perimeter mounting flange 22 of the display unit. In this instance, when the mounting apertures 44 are aligned with the mounting sockets 28 of the display unit, the rear surface of the perimeter flange 22 of the display unit can be located parallel to and substantially abutted against the sloped upper portions of the front edges. When the mounting apertures 44 are aligned with the mounting sockets in the display unit, suitable mounting screws 48 can be inserted through the mounting apertures 44 and into the threaded mounting sockets 28 of the display unit so that tightening the screws 48 clamps the side walls 42 of the base frame against laterally opposing sides of the rear portion 24 of the display unit.

When using a smaller display unit in which the rear portion 24 of the display unit is much narrower than the width between the side walls 42, extra washers or spacers may be used between the sides of the rear portion of the display unit and the side walls of the base frame. Smaller display units may have a perimeter mounting flange that is fully received in the lateral direction between the side walls 42 of the base frame such that the display unit can be freely pivoted about a common axis of the mounting sockets 28 relative to the base frame without interference from the perimeter mounting flange 22.

At the top ends of the front edges 46, the front edges 46 of the side walls 42 meet the top edges of the side walls by a radius that is curved about the uppermost mounting apertures 44 in the side walls 42. In this manner, the uppermost mounting apertures 44 are spaced below the horizontal top edges of the side walls by the same distance that the mounting apertures are spaced from the front edges 46. Accordingly, the display unit can be pivoted from an upright position in which the perimeter mounting flange 22 of the display unit is parallel to or abuts the front edges 46 of the side walls, and lowered position in which the perimeter mounting flange 22 of the display unit is parallel to or abuts the top edges of the side walls.

A plurality of sonar module mounting brackets 50 are supported on the base frame adjacent the rear of the base frame for supporting the sonar module 16 of the marine data instrument thereon. Each sonar module mounting bracket 50 includes a first flange 52 with a mounting aperture therein and a second flange 54 mounted at right angles to protrude from one end of the first flange 52 to form an L shaped bracket. An aperture, or in some instances an elongated fastener slot extending longitudinally away from the first flange 52, is provided within each second flange to receive a suitable fastener therein. Two of the brackets 50 are laterally spaced apart along the rear edge of the base member 40 of the base frame while two additional brackets 50 are supported on inner surfaces of the side walls 42 of the base frame respectively. Each of the brackets 50 is supported on the base frame using a mounting screw penetrated through the aperture in the first flange 52 to mount the first flange flat against a corresponding inner surface of the base member. The second flanges 54 of the brackets are all positioned to lie in a common mounting plane at the rear side of the base frame such that the common mounting plane is perpendicular to the base member and both side walls of the base frame.

The sonar module 16 includes a sonar module housing with mounting sockets formed therein to enable the sonar module housing to be fastened with fasteners extending through rubber washers and the mounting apertures or slots within the second flanges 54 of all four mounting brackets 50. In this manner the sonar module is supported in an upright orientation adjacent a rear of the base frame such that the sonar module is entirely contained within a boundary between the side walls and above the base member of the base frame. The sonar module housing is further supported below the elevation of the mounting apertures 44 that support the display unit 12 thereon. The sonar module 16 is thus supported by the brackets 50 to be positioned rearwardly of the display unit and at a lower elevation than the display unit.

The first assembly also includes a battery mounting arrangement including a rectangular pad 56 of a resilient grip material which is sized to match the footprint of the battery 18. The pad 56 is situated on the base member 40 adjacent the front side of the base frame at a central location between the side walls to receive the battery seated thereon such that the battery is fully contained within the boundaries of the base frame between the side walls and above the base member while being spaced forwardly of the sonar module and fully below the display unit 12. To retain the battery seated on the pad 56, the battery mounting arrangement further includes a pair of adjustable straps 58 which are anchored at opposing ends on the base member or are threaded through slots in the base frame at opposing sides of the pad 56 such that the straps 58 are each arranged to extend up and over the battery or wrap around the battery for strapping the battery against the pad 56. Each strap 58 includes an intermediate releasable connector incorporated therein at an intermediate location to permit the strap to be released and separated into first and second flexible strap portions that enable the battery to be removed from the base frame when the connectors are separated.

In use, the display unit 12 is mounted onto the base frame such that a lower portion of the perimeter flange may be substantially abutted against the sloped upper portions of the front edges 46 of the side walls with clamping screws inserted through the mounting apertures 44 in the side walls to cooperate with the mounting sockets 28 of the display unit and thereby clamp the side walls against opposing sides of the rear portion 24 of the display unit with rubber or washers or spacers received between the side walls and the sides of the display unit to provide a snug fit. As a result of the proximity of the mounting apertures 44 to the top edge of the side walls, the display unit can also be pivoted to a horizontal orientation about the common axis of the mounting screws in the mounting sockets 28 of the display unit to adjust the slope and orientation of the screen of the display unit as may be desired. The sonar module is in turn supported on the mounting brackets 50 at the rear side of the base frame while the battery is supported by the battery mounting arrangement as described above. Suitable communication cables are interconnected between the display unit, the sonar module, the battery, and the transducer head to enable operation of the marine data instrument in the usual manner. The base frame of the first assembly 30 of the mounting apparatus allows the display unit to be readily transported together with the sonar module and the battery in an operational state such that the marine data instrument is readily adapted for use in temporary locations to enable the marine data instrument to be readily transported between different marine vessels or between different ice fishing locations for example.

Turning now to FIGS. 5 through 9, a second embodiment of the first assembly 30 of the marine data instrument mounting apparatus will now be described in further detail. In this instance, the first assembly 30 again includes a base frame 60 comprised of a base member 62 in the form of a flat rectangular plate at the bottom of the base member for being engaged on a suitable supporting surface, and two side walls 64 which extend perpendicularly upward from laterally opposing ends of the base member 62 such that the side walls 64 are parallel and spaced apart from one another by a lateral width which is greater than the overall width of the display unit. Each side wall is stepped in height such that the top edge defines a raised forward portion 66 defining a first horizontal edge portion at a first height from the base member and a rearward portion 68 defining a second horizontal edge portion at a second height from the base member which is reduced relative to the forward portion 66.

Figures 5, 6:
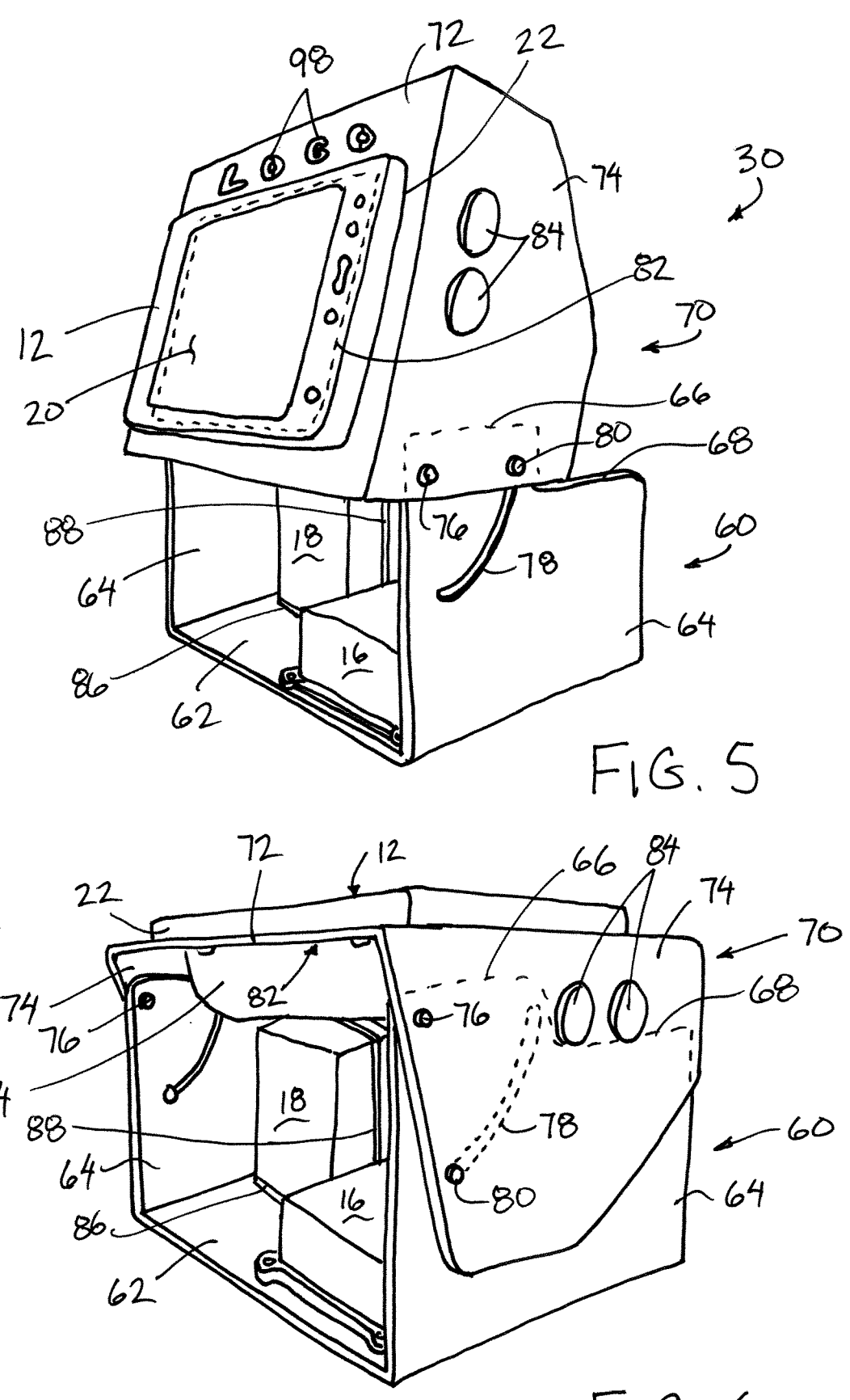
FIG. 5 is a perspective view of a first assembly of the marine data instrument mounting apparatus according to a second embodiment, shown in a working position.
FIG. 6 is another perspective view of the first assembly of the marine data instrument mounting apparatus according to the second embodiment of FIG. 5, shown in a stored position.
Figure 8:
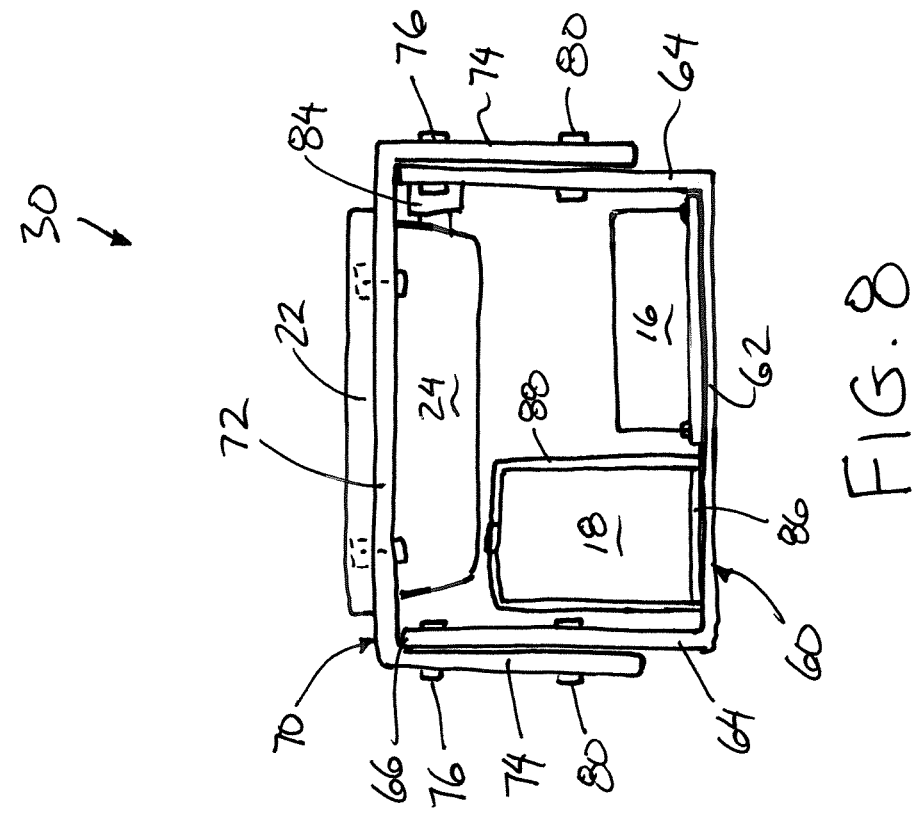
FIG. 8 is a rear elevational view of the first assembly of the marine data instrument mounting apparatus according to the second embodiment of FIG. 5, shown in the stored position.
Figure 7:
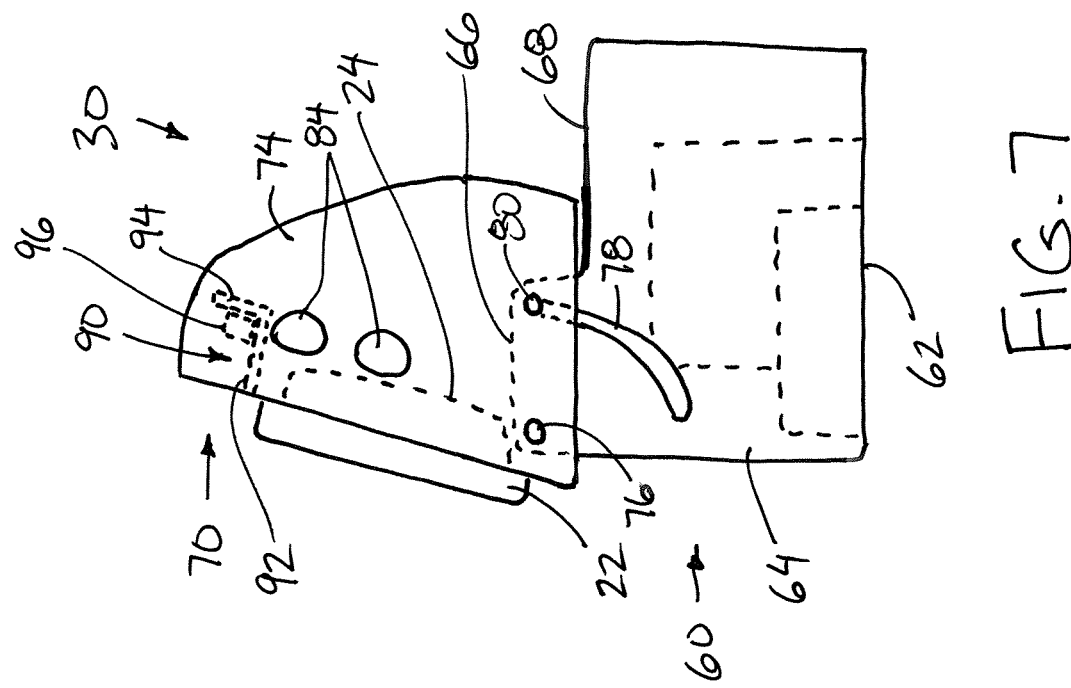
FIG. 7 is a side elevational view of the first assembly of the marine data instrument mounting apparatus according to the second embodiment of FIG. 5, shown in the working position.
Figure 9:
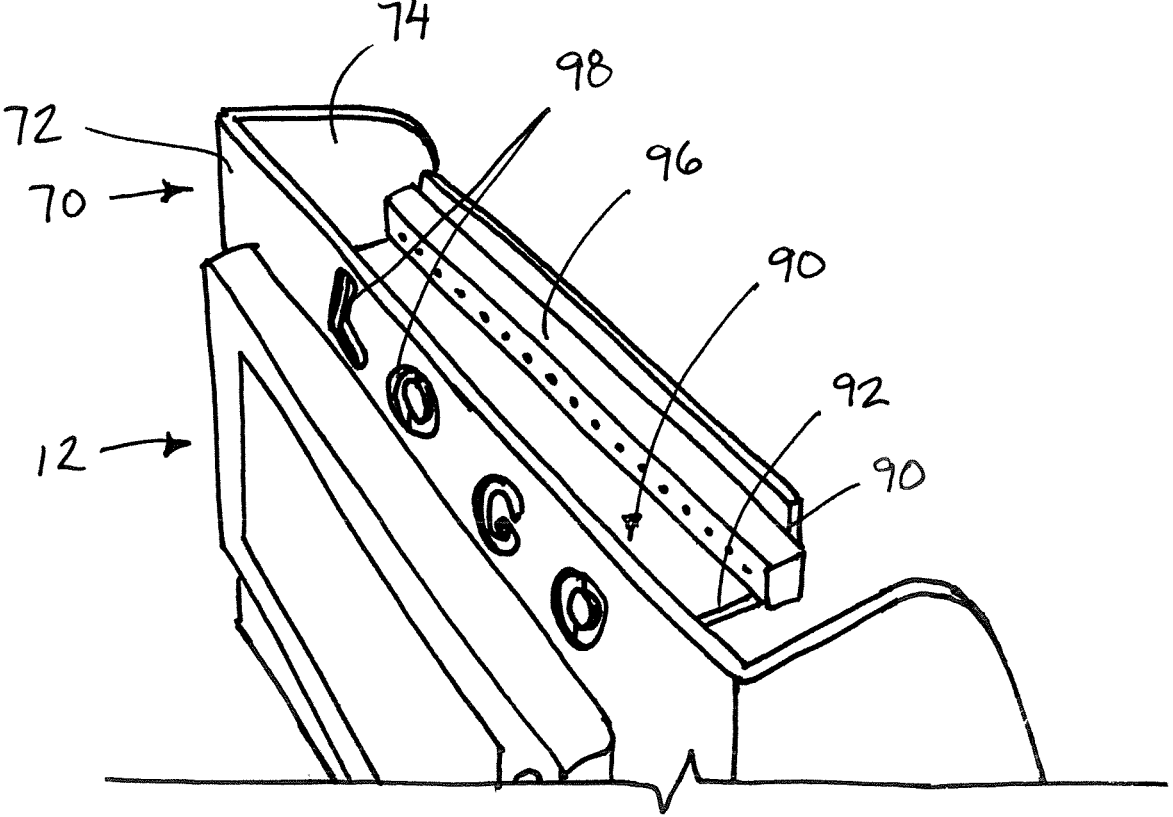
FIG. 9 is a perspective view of an illuminated tray on the first assembly of the marine data instrument mounting apparatus according to the second embodiment of FIG. 5.

The first assembly 30 in this instance further includes a pivot frame 70 which is pivotally supported relative to the base frame for movement between a working position shown in FIGS. 5 and 7 and a stored position shown in FIGS. 6 and 8. The pivot frame 70 generally includes a front wall 72 in the form of a flat rigid rectangular plate and two side flanges 74 which extend in a common direction perpendicularly outward from the front wall 72 so that the side flanges are parallel to one another at laterally opposing ends of the front wall. The side flanges 74 are spaced apart from one another by a lateral distance which is slightly greater than the lateral distance between the side walls 64 of the base frame such that in a mounted position of the pivot frame 70 on the base frame 60, the side flanges 74 can be located parallel and substantially against the outer sides of corresponding ones of the side walls 64 of the base frame with nylon washers that provide a minimal gap between the side flanges and the side walls to reduce friction during pivoting of the pivot frame relative to the base frame. The front wall 72 is supported relative to the base frame so as to be generally horizontal in the stored position while extending upward and rearward at a slope in the working position. The side flanges 74 remain generally vertical and alongside corresponding ones of the side walls 64 throughout displacement between the stored and working positions. The side flanges 74 generally extend downward from the opposing ends of the front wall 72 in the stored position, while extending primarily rearward of the front wall 72 in the working position.

The pivotal connection between the base frame 60 and the pivot frame 70 is formed by a pair of pivot shafts 76 communicating through cooperating apertures in the side walls 64 of the base frame 60 and the side flanges 74 of the pivot frame 70. The pivot shafts 76 define a common pivot axis of the pivot frame 70 relative to the base frame in which the common pivot axis extends laterally between the side walls 64 at opposing ends of the base frame. The common pivot axis defined by the pivot shafts 76 is situated at the top of the base frame adjacent the front side thereof so as to be situated within the forward portion 66 of the side walls at an elevation that is greater than the rearward portion 68 of the side walls. The pivot shafts 76 are accordingly located in proximity to the front of the pivot frame in the stored position which corresponds to a bottom of the pivot frame in the working position.

To support the pivot frame at any selected angular orientation between the stored position and the working position, an additional connection between each side wall 64 and the corresponding side flange 74 provides a suitable friction at a location spaced radially from the pivot shafts 76 that the pivot frame is self-supporting at any selected orientation as a result of the friction. More particularly, each side wall 64 includes an arcuate slot 78 formed therein which is curved about the pivot axis of the shafts 76.

A follower 80 is fastened to extend through each side flange 74 of the pivot frame for alignment with the corresponding arcuate slot in the adjacent side wall 64. The follower 80 may comprise a threaded fastener having a head at one end that is threaded into a barrel nut with a smooth shaft and a corresponding head at the opposing end which serve to apply a clamping pressure that clamps the corresponding side flange against the outer surface of the corresponding side wall 64 to provide the required friction between the side flanges and the side walls so that the pivot frame is self-supporting at any selected position relative to the base frame 60. As the pivot frame is pivoted about the pivot shafts 76 by overcoming the frictional forces, the followers 80 are displaced along the respective arcuate slot 78.

The arcuate slots 78 serve to define the full range of pivotal movement of the pivot frame 70 relative to the base frame between the working position and the stored position. Opposing ends of the slots 78 receiving the followers 80 therein effectively define stops that prevent any further pivotal movement of the pivot frame beyond either one of the working or stored positions. In the stored position, the front wall 72 is abutted against the forward portions 66 of the top edge of the side walls 64 to function as an additional stop that limits any further downward pivotal movement of the pivot frame beyond the stored position.

A display opening 82 is formed in the front wall 72 of the pivot frame which is suitably sized to receive the rear portion 24 of the display unit inserted through the display opening while the perimeter flange 22 of the display unit overlaps the front face of the front wall about the full perimeter surrounding the display opening 82. In this manner, suitable mounting screws can be fastened through the peripheral portion of the front wall that surrounds the display opening 82 in alignment with mounting holes formed in the perimeter mounting flange 22 of the display unit for fastening the perimeter mounting flange to the front wall. In this manner the display unit is mounted such that the display screen lies parallel to and forward of the front wall while the rear portion 24 of the display unit extends through the display opening so as to protrude rearwardly from the rear side of the front wall. The rear portion of the display unit is considerably narrower than the lateral width of the front wall and the lateral width between the side walls of the base frame such that the rear portion 24 of the display unit is readily received between the side walls of the base frame when the pivot frame is pivoted downwardly into the stored position.

The side flanges 74 of the pivot frame 70 also support a pair of auxiliary sockets 84 which permit connection of auxiliary accessories to the electrical power of the batteries, for example USB ports, a battery charging port, a voltage meter, a master power switch, and the like. The auxiliary sockets are electrical connectors mounted in the side flange 74 at one side of the pivot frame such that an internal portion of the sockets remains above the reduced height of the rearward portion 68 of the side walls even when the pivot frame is pivoted downwardly into the stored position as shown in FIG. 6 such that the auxiliary sockets do not interfere with pivoting into the stored position.

In view of the larger footprint of the base member according to this embodiment, the sonar module 16 in this instance may be mounted substantially horizontally directly on top of the base member 62 in proximity to the front side of the base member, offset to one side of the base member. The sonar module mounting arrangement in this instance comprises suitable sockets formed in the base member for alignment with corresponding mounting apertures in the housing of the sonar module.

The first assembly 30 in this instance again comprises a battery mounting arrangement in the form of a pad 86 supported on the base member offset towards an opposing side of the base frame relative to the sonar module. A set of straps 88 are anchored to the base member similarly to the straps 58 of the first embodiment such that a battery can be releasably and securely mounted relative to the base member as desired. The mounting arrangements support the battery and sonar module laterally beside one another between the side walls of the base member while the height of the side walls ensures that the display unit remains supported above the battery and the sonar module even when folded downwardly into the stored position.

The pivot frame further includes a tray 90 supported thereon adjacent a top end of the pivot frame in the working position while being positioned rearwardly of the front wall between the side flanges 74. The tray 90 is formed by a first panel 92 comprising a flat rectangular plate which extends perpendicularly rearward from the front wall in proximity to the upper perimeter edge of the display opening 82. Laterally opposing ends of the first panel 92 are spaced inwardly from the side flanges 74 at both ends to ensure there is no interference between the tray 90 and the side walls of the base frame when the pivot frame is folded into the stored position. The tray 90 further includes a second panel 94 which extends upward from the rear edge of the first panel 92 at a location spaced rearwardly and substantially parallel to the front wall while remaining below the height of the top edge of the front wall in the working position. A portion of the front wall above the display opening 82 together with the first panel 92 and the second panel 94 of the tray 90 effectively form a U-shaped trough with an open top and which is suitable for supporting one or more fishing lures thereon.

A light source 96 is provided in the form of elongate strip supporting a row of light emitting diodes thereon. The light source is mounted along the second panel 94 at the rear of the tray 90 such that the diodes are directed to emit light forwardly towards the rear side of the front wall. In this manner, when activated, the light source illuminates objects supported on the tray 90. When using fluorescent lures, the lures can be placed on the tray and illuminated by the light source 96 to charge the lures with light so that the lures will glow effectively when subsequently used for fishing.

The light source 96 also serves to provide backlighting to a portion of the front wall above the display opening 82. In this regard, the upper portion of the front wall above the display opening 82 is provided with one or more light passages 98 which allow some transmission of light through the front wall. This can be accomplished by providing the front wall with one or more portions of translucent material or by providing through holes in the front wall allowing transmission of light therethrough. In the illustrated example, a plurality of openings are formed in the upper portion of the front wall that represent characters of a logo or brand name which are in turn illuminated or backlit by the light source when the light source is activated.

Figure 10:
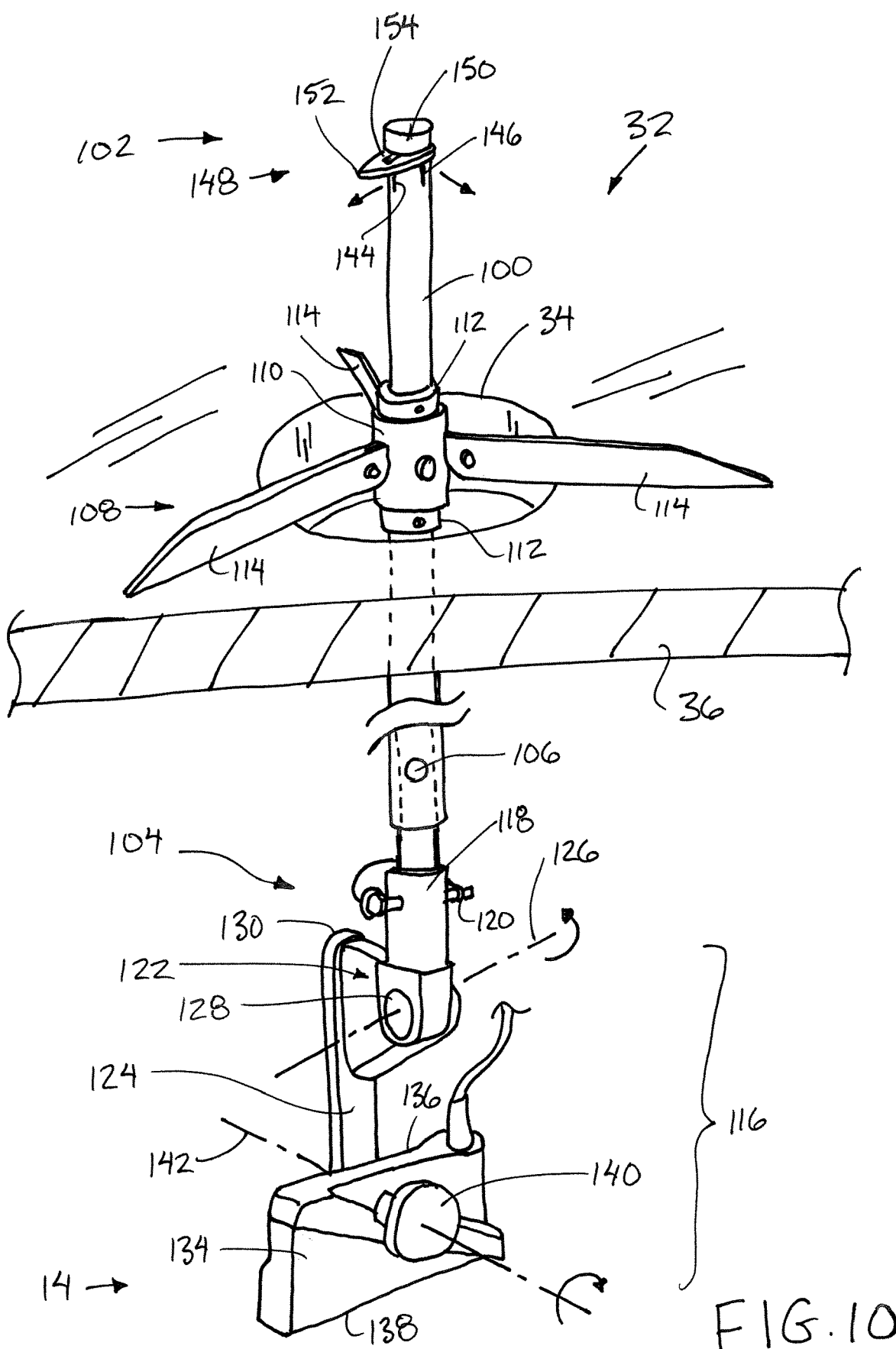
FIG. 10 is a perspective view of a second assembly of the marine data instrument mounting apparatus for use with the first assembly of the marine data instrument mounting apparatus according to either one of the first embodiment of FIG. 1 or the second embodiment of FIG. 5.
Figure 11:
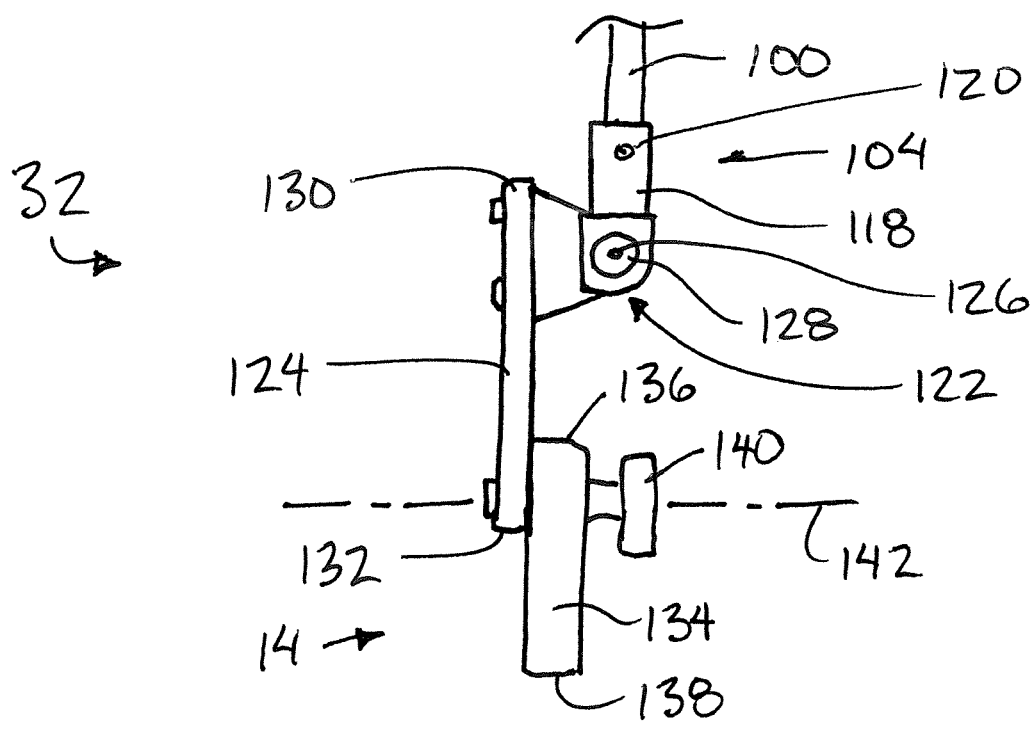
FIG. 11 is a side elevational view of the bottom end of the second assembly of the sonar instrument mounting apparatus according to FIG. 10.

Turning now to FIGS. 10 and 11, the second assembly 32 of the marine data instrument mounting apparatus will now be described in further detail. As noted above, the second assembly 32 is arranged to suspend the transducer head 14 from a suitable boat or other mounting structure in proximity to a body of water so that the transducer head is submerged within the body of water. In the illustrated embodiment, the second assembly 32 is adapted for suspending the transducer to extend through an ice fishing hole 34 in a surrounding sheet of ice 36 above the body of water. The second assembly 32 includes a telescoping pole 100 having an upper tubular section telescopically receiving a lower tubular section therein to adjust an overall length of the pole between a top end 102 and a bottom end 104 of the pole. A conventional latching mechanism 106 may be provided to selectively lock the upper and lower sections relative to one another at a selected overall length of the pole, while permitting the sections to be readily released and adjusted in length when desired.

A mounting frame 108 serves to support the pole 100 extending through the ice fishing hole 34 by engaging the mounting frame 108 on the sheet of ice 36 immediately surrounding the hole. The mounting frame includes a rotating collar 110 which is rotatably supported about the upper section of the telescoping pole 100 in proximity to the top end of the pole but at a location spaced slightly below the top end so that a portion of the pole continues to extend above the rotating collar 110. Additional upper and lower mounting collars 112 are mounted about the pole immediately above and immediately below the rotating collar. Each of the upper and lower mounting collars includes a setscrew threaded into the collar to fix the collar relative to the pole. The upper and lower mounting collars 112 remain fixed relative to the pole and serve to locate the rotating collar 110 in the longitudinal direction of the pole at a fixed location while enabling the rotating collar 110 to freely rotate relative to the pole between the mounting collars 112.

The mounting frame 108 further includes three support legs 114 which extend radially outward from the rotating collar 110 upon which they are supported. Each of the legs is pivotal between a folded position extending downwardly from the rotating collar 110 generally alongside the pole and an extended position extending radially outward from the rotating collar. The three legs 114 are situated at evenly spaced apart positions in the circumferential direction so as to define an overall diameter which is much greater than a diameter of the ice hole 34 such that the mounting frame 108 is adapted to be engaged upon an upper surface of the sheet of ice 36 while supporting the pole 100 to extend through the ice fishing hole 34. As a result of the rotating collar 110, the pole can be freely rotated relative to the mounting frame 108 which remains fixedly engaged on the sheet of ice in use. Each support leg 114 is connected to the rotating collar 110 so as to be pivotal about a horizontal pivot axis oriented tangentially to the pole.

The inner end of each leg is formed with an integral stop that engages the outer surface of the collar when the leg reaches the extended position to prevent further upward pivotal movement of the leg relative to the rotating collar and the pole once the extended position has been reached, however, the stop formed at the inner end of each leg does not interfere with downward pivotal movement of the legs into the folded position. A separate stop is engaged when the leg reaches the folded position alongside the pole.

Figure 12:
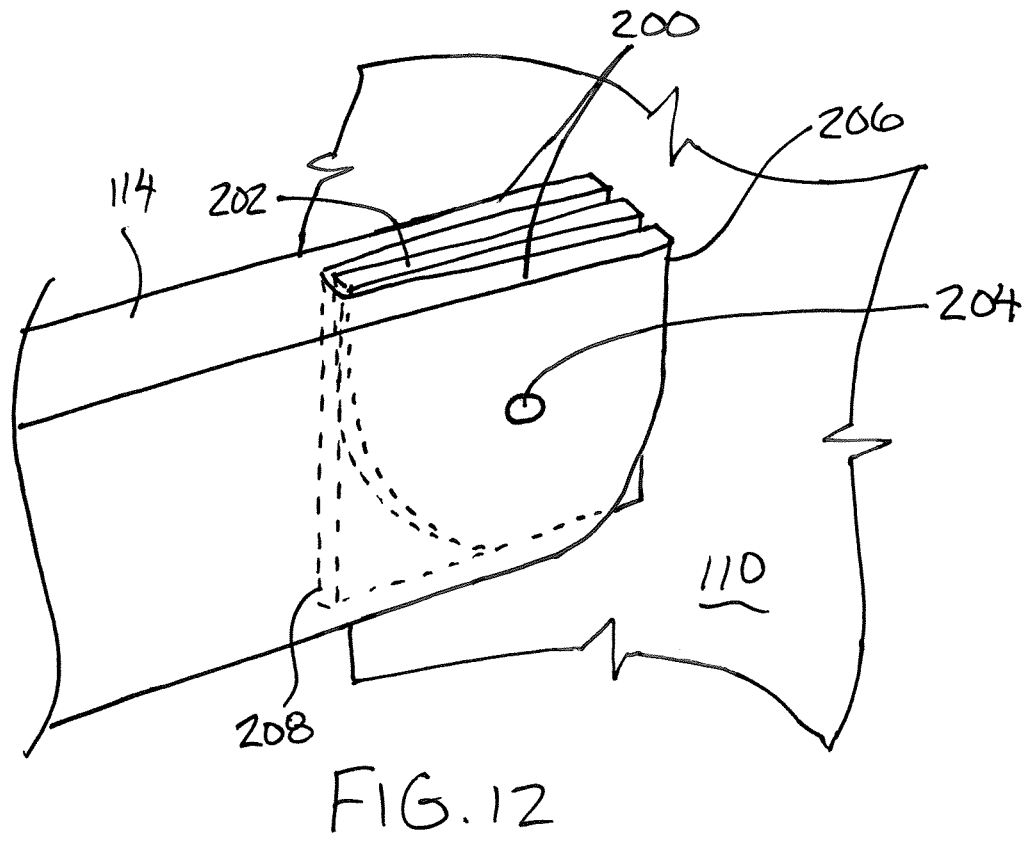
FIG. 12 is an enlarged perspective view of the legs of the mounting frame of the second assembly of the marine data instrument according to FIG. 10.

As shown in FIG. 12, the inner end of each leg 114 is slotted or forked to define two parallel flanges 200 that receive a mounting flange 202 snugly therebetween. The mounting flange 202 is fixed to the rotating collar 110 for rotation about the pole 100 together with the collar 110. A pivot shaft 204 extends between the parallel flanges 200 through the mounting flange 202 to define a pivot axis of the leg 114. At the inner end of the leg, the upper portion of the inner end surface of the leg is squared off normal to the longitudinal axis of the leg to define first stops 206 that engage the outer surface of the rotating collar 110 in the extended position to prevent continued rotation of the leg beyond the extended position. The lower portion of the inner end surface of each leg is rounded to form a radius centred on the pivot axis so as to provide no interference to the downward pivoting of the leg from the extended position to the folded position. The outer end of the mounting flange 202 is similarly squared off at the top edge and rounded at the bottom with a radius centered on the pivot axis, thereby engaging the inner end of the slot between the parallel flanges 200 in the extended position while not interfering with downward pivoting into the folded position. The inner end of the slot formed between the parallel flanges 200 is squared off perpendicularly to the longitudinal direction of the leg such that the inner end of the slot abuts the bottom edge of the mounting flange 202 as the leg 114 reaches the folded position such that the inner end of the slot defines a second stop 208 that prevent continued rotation of the leg 114 beyond the folded position alongside the pole.

The second assembly 32 further includes a transducer mounting assembly 116 arranged to be mounted on the bottom end of the pole. The assembly includes a mounting sleeve 118 that is arranged to slide over the bottom end of the pole with transverse apertures located in the mounting sleeve in the bottom end of the pole that align with one another to receive a latching pin 120 that selectively retains the assembly on the bottom end of the pole.

A first pivot coupling 122 is mounted on the mounting sleeve 118 for coupling a mounting body 124 onto the mounting sleeve such that the mounting body 124 is pivotal relative to the mounting sleeve about a first pivot axis 126 that is perpendicular to the longitudinal axis of the pole so as to be oriented diametrically relative to the pole. The first pivot coupling includes a conventional pushbutton lock 128 that automatically locks the pivot coupling at a selected angular orientation until released by pushing the button. The mounting body can thus be pivotally displaced about the first pivot axis 126 relative to the pole through a range of angles when the button is depressed while automatically being immovably locked at a selected position when the button is released.

The mounting body 124 is an elongate member having a longitudinal axis extending between a first end 130 and an opposing second end 132 of the body. The first end of the mounting body is fixed by fasteners to one side of the first pivot coupling 122. The opposing second end of the mounting body 124 includes a mounting socket formed therein for connection to the transducer head.

The transducer head 14 has a main body 134 having (i) a top end 136 through which a communication cable extends for connection to the display unit 12 and (ii) an opposing bottom end 138 locating a sensing surface thereon through which sonar signals are emitted and received. A mounting bore extends through the body of the transducer head to receive a mounting screw 140 extending through the mounting bore and into the mounting socket at the second end of the mounting body 124 to define a second pivot coupling that supports the transducer head 14 on the bottom end of the mounting body 124 for pivotal movement about a second pivot axis 142 relative to the mounting body. The second pivot axis is oriented perpendicularly to the first pivot axis.

In this arrangement, the transducer mounting assembly 116 supports the transducer head relative to the pole for displacement of the transducer head between a first forward down mode of operation and a second perspective mode of operation.

In the first mode of operation corresponding to the transducer head being operated in a forward mode or a down mode, the mounting body 124 is oriented such that the longitudinal axis of the mounting body is generally parallel to the longitudinal axis of the pole. The second pivot axis in this instance is perpendicular to both the longitudinal axis of the pole and the first pivot axis. The bottom sensing surface 138 of the transducer head can be oriented generally horizontally or the transducer head can be pivoted about the second pivot axis 142 so that the bottom surface 138 of the transducer head extends at an upward or downward slope depending upon the transducer model and the transducer head being in a selected forward or down mode.

A first mark 144 is provided on the exterior surface of the pole adjacent the top end at one side of the pole so as to be offset in a radial direction from a central axis of the pole so as to be parallel to the first pivot axis 126 and perpendicular to the second pivot axis 142.

In the perspective mode of operation, the bottom sensing surface 138 of the transducer head 14 is oriented parallel to the first pivot axis. The mounting body 142 in this instance is pivoted upwardly towards the top end of the pole from the first forward down mode of operation such that the longitudinal axis of the mounting body is no longer parallel to the pole. The mounting body can be pivoted by releasing the pushbutton lock 128 which permits the mounting body to be locked in the second perspective mode at any one of a plurality of angular orientations of the longitudinal axis of the mounting body relative to the pole including increments of 5°, 10°, 15°, 20°, 25°, 30°, 35°, 45° and the like. At the set angular orientation corresponding to the second perspective mode of operation, the longitudinal axis of the mounting body is sloped and transverse to the pole so as to extend in a partly radial direction from the pole.

A second mark 146 is formed on the exterior surface of the pole adjacent the top end at a location spaced 90 degrees about the circumference of the pole from the first mark 144. The second mark 146 is similarly offset in a radial direction from the central axis of the pole. More particularly, the second mark indicates a radial direction relative to the pole which is aligned with the radial direction that the mounting body 124 extends once deflected about the first pivot axis 126 from the first mode of operation.

An indicator 148 is supported on the top end of the pole in proximity to the first mark 144 and the second mark 146. The indicator 148 has a body in the form of a flat plate oriented perpendicularly to the pole axis while being mounted rotatably about the pole. The indicator 148 is retained from above by a cap 150 which retains the indicator

148 on the pole while enabling the indicator to remain rotatable about the pole. The shape of the indicator plate is elongated in one radial direction towards a distal end 152 which is pointed for indicating a radial direction. A slot 154 extends vertically through the body of the indicator 148 in which the slot is elongated in the radial direction indicated by the indicator. The indicator is supported for pivoting between a first position in which the radial direction indicated by the slot 154 of the indicator is aligned with the first mark 144 and a second position in which the radial direction of the indicator 148 is aligned with the second mark 146. The through opening formed by the slot 154 allows the operator to more easily visually align the indicator with the first mark 144 or the second mark 146. The indicator 148 is thus oriented to be pivoted between first and second positions which are 90 degrees apart about the circumference of the pole to correspond to the first (forward or down) mode of operation and the second (perspective) mode of operation respectively of the transducer mounting assembly 116 which is submerged in the body of water during use.

Figure 13A:
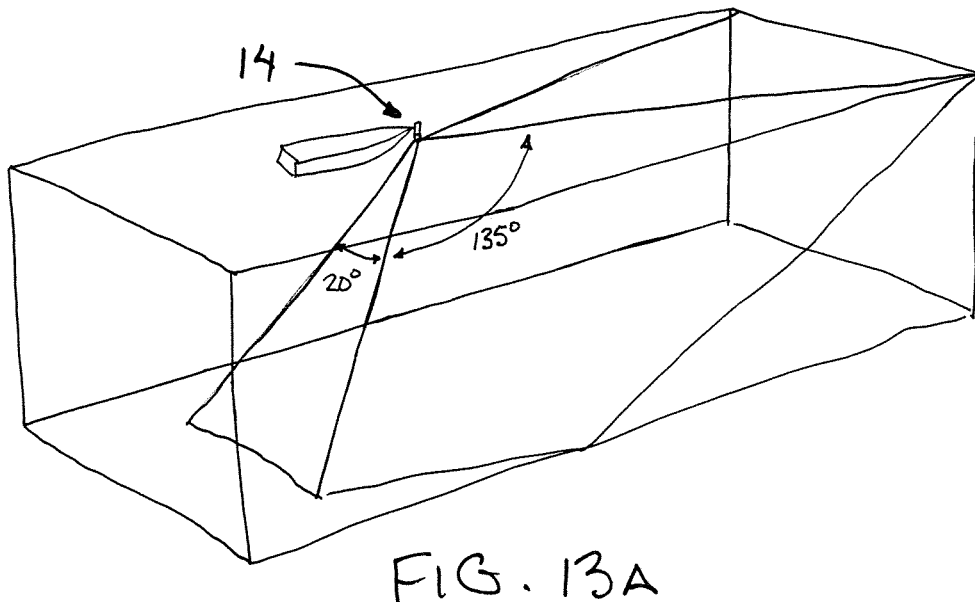
FIGS. 13A, 13B and 13C are schematic representations of the field of view of a typical transducer when operating in a forward mode, a down mode, and a perspective mode.
Figure 13B:
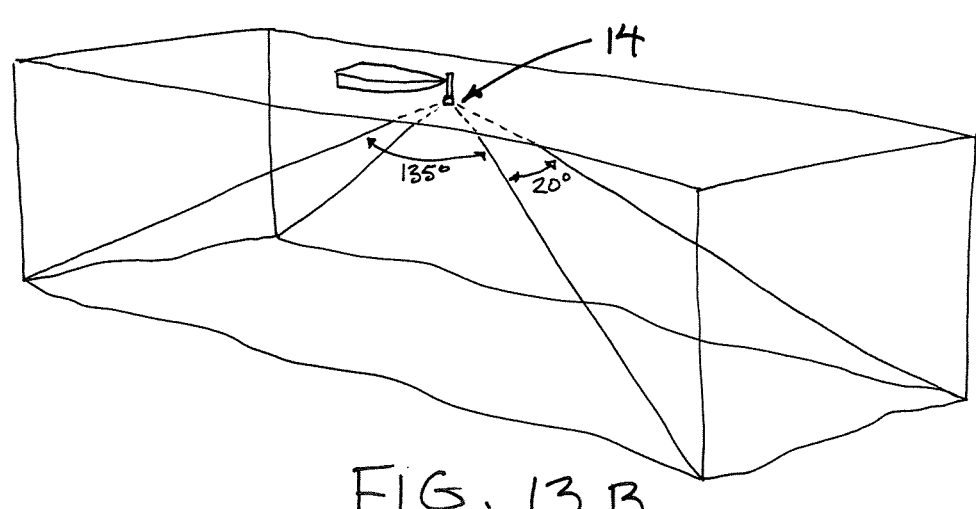
Figure 13C:
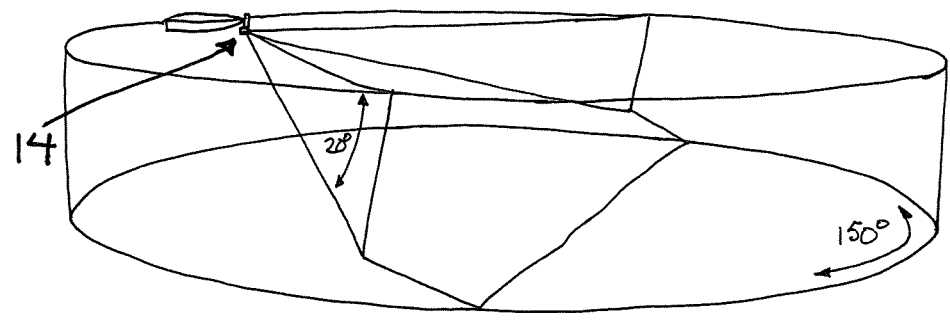

In use, the operator selects the configuration of the transducer mounting assembly to support the transducer head relative to the pole in either the first (forward or down) mode of operation or the second (perspective) mode of operation. The field of view of the transducer 14 is schematically represented for the forward mode in FIG. 13A, for the down mode in FIG. 13B and for the perspective mode in FIG. 13C.

Before supporting the mounting frame on the sheet of ice 36 with the bottom end of the pole extending through the ice fishing hole 34 to submerge the transducer head in the body of water, the operator pivots the indicator 148 into the corresponding first or second position that corresponds to the first or second mode of operation such that the operator can subsequently confirm what mode of operation the transducer mounting assembly is in and the pointing direction of the transducer when the bottom end of the pole is subsequently submerged in the body of water so as to be out of sight by the operator.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A marine data instrument mounting apparatus for supporting a display unit of a marine data instrument relative to a battery, in which the display unit includes a housing, a display screen extending laterally across a front face of the housing, and a pair of threaded mounting sockets at laterally opposing sides of the housing, the apparatus comprising:

a base frame including a base member forming a bottom of the apparatus and two side walls extending upwardly from the base member at laterally spaced apart locations; and a mounting arrangement arranged to support the battery securely on the frame above the base member and between the side walls;

wherein the two side walls of the base frame are spaced apart to receive a portion of housing of the marine data instrument extending laterally between the two side walls;

wherein the two side walls include two mounting apertures formed in the two side walls in alignment with one another along a common axis so as to be arranged for alignment with the threaded mounting sockets of the housing; and wherein the two mounting apertures are spaced above the mounting arrangement so as to be arranged to support the display unit on the base frame at least partly above the battery.

2. The apparatus according to claim 1 wherein the display unit includes a perimeter mounting flange at the front face protruding outwardly from a remaining portion of the housing in a direction of the display screen and wherein the mounting apertures are spaced rearwardly from a front edge of the side walls of the frame by a prescribed distance such that the mounting apertures are aligned with the mounting sockets of the display unit when the perimeter mounting flange abuts the front edges of the side walls of the base frame.

3. The apparatus according to claim 2 wherein the front edges of the side walls are sloped upwardly and rearwardly.

4. The apparatus according to claim 1 further comprising a plurality of mounting brackets supported on the side walls so as to be arranged to support a sonar module of the marine data instrument on the base frame securely on the base frame above the base member and between the side walls.

5. The apparatus according to claim 4 wherein the mounting brackets are located adjacent a rear of the base frame and below the mounting apertures in the frame.

6. A marine data instrument mounting apparatus for supporting a display unit of a marine data instrument, in which the display unit includes a housing, a display screen extending laterally across a front face of the housing, and a perimeter mounting flange at the front face protruding outwardly from a remaining portion of the housing in a direction of the display screen, the apparatus comprising:

a base frame including a base member forming a bottom of the apparatus and two side walls extending upwardly from the base member at laterally spaced apart locations; and a pivot frame including a front wall having a display opening formed therein and two side flanges at opposing ends of the front wall, wherein the side flanges are pivotally coupled to the two side walls of the base frame respectively such that the pivot frame is pivotal relative to the base frame about a pivot axis between a stored position and a working position, wherein the front wall is in an upright orientation in the working position, and wherein the pivot frame protrudes a greater distance from the base member in the working position than in the stored position;

wherein the front wall is arranged to support the perimeter mounting flange of the display unit in overlapping configuration with the front wall about a periphery of the display opening while the display opening in the front wall is sized to receive said remaining portion of the housing of the display unit inserted therein.

7. The apparatus according to claim 6 wherein the pivot axis is adjacent to a bottom of the front wall in the working position of the pivot frame.

8. The apparatus according to claim 6 wherein the pivot axis is adjacent to a front of the base frame.

9. The apparatus according to claim 6 wherein the front wall of the pivot frame is substantially parallel to the base member of the base frame in the stored position.

10. The apparatus according to claim 6 further comprising stops preventing displacement of the pivot frame beyond the working position, wherein the front wall of the pivot frame extends upward at a rearward slope in the working position.

11. The apparatus according to claim 6 further comprising a mounting arrangement arranged to support a battery of the marine data instrument securely on the base frame above the base member and between the side walls such that the battery does not interfere with pivotal movement of the display unit with the pivot frame between the stored position and the working position.

12. The apparatus according to claim 6 further comprising:

a tray supported rearwardly of the front wall so as to be arranged to receive one or more fishing lures supported thereon; and an ultraviolet light source supported adjacent to the tray so as to be arranged to illuminate said one or more fishing lures supported on the tray.

13. The apparatus according to claim 12 wherein said light source is directed forwardly towards a rear of the front wall in the working position so as to provide backlighting to a portion of the front wall above the display opening in the working position.

14. A marine data instrument mounting apparatus for supporting a transducer head of a marine data instrument relative to a supporting surface in which the transducer head includes mounting bore, the apparatus comprising:

a pole extending longitudinally between a top end and a bottom end of the pole;

a mounting frame arranged to support the pole relative to the supporting surface, the mounting frame being rotatable relative to the pole about a longitudinal axis of the pole; and a transducer mounting assembly supported on the bottom end of the pole, the transducer mounting assembly comprising:

(i) a mounting body having a longitudinal axis;

(ii) a first pivot coupling supporting the mounting body on the bottom end of the pole such that the mounting body is pivotal about a first pivot axis between a first mode in which the longitudinal axis of the mounting body is substantially parallel to the pole and a second mode in which the longitudinal axis of the mounting body is oriented transversely to the pole; and (iii) a second pivot coupling arranged for operative connection to the mounting bore of the transducer head so as to support the transducer head for pivotal movement relative to the mounting body about a second pivot axis oriented perpendicularly to the first pivot axis.

15. The apparatus according to claim 14 further comprising an indicator supported on the pole in proximity to the top end of the pole, the indicator being pivotal about a longitudinal axis of the pole and being arranged to indicate a direction radially of the pole corresponding to an orientation of the transducer head relative to the pole.

16. The apparatus according to claim 15 wherein the indicator is pivotal between a first mark on the pole corresponding to the first mode and a second mark on the pole corresponding to the second mode, and wherein the indicator is pivotal through a range of 90 degrees between the first mark and the second mark.

17. The apparatus according to claim 16 wherein one of the marks corresponds to a radial direction of the indicator that is perpendicular to the first pivot axis.

18. The apparatus according to claim 16 wherein the mounting frame comprises:

a collar supported rotatably on the pole and supporting a plurality of mounting flanges thereon to extend radially outwardly from the collar at circumferentially spaced apart locations;

a plurality of legs pivotally supported on the mounting flanges on the collar respectively such that each leg is pivotal relative to the respective mounting flange between an extended position extending radially outward from the pole and a folded position extending alongside the pole;

wherein each leg includes an inner end adjacent to the collar having a slot formed therein to define two parallel plates (i) receiving the respective mounting flange between the parallel plates and (ii) supporting a pivot shaft extending between the parallel plates to define an axis of rotation of the leg relative to the collar; and wherein the inner end of the slot is formed with a first stop limiting pivotal movement of the leg beyond the extended position and a second stop limiting pivotal movement of the leg beyond the folded position.

* * * * *